US012761493B2

(12) United States Patent
Masuda et al.

(10) Patent No.: US 12,761,493 B2
(45) Date of Patent: Oct. 13, 2026

(54) IMAGING APPARATUS

(71) Applicant: JVCKENWOOD Corporation, Yokohama (JP)

(72) Inventors: Shogo Masuda, Yokohama (JP); Toshihide Kobayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/223,073

(22) Filed: May 30, 2025

(65) Prior Publication Data

US 2025/0291199 A1 Sep. 18, 2025

Related U.S. Application Data

(63) Continuation of application No. PCT/JP2023/037059, filed on Oct. 12, 2023.

(30) Foreign Application Priority Data

Dec. 21, 2022 (JP) ................................ 2022-204350

(51) Int. Cl.
*G02B 27/10* (2006.01)
*G02B 5/30* (2006.01)
*H04N 23/16* (2023.01)

(52) U.S. Cl.
CPC ....... *G02B 27/1013* (2013.01); *G02B 5/3025* (2013.01); *H04N 23/16* (2023.01)

(58) Field of Classification Search
None
See application file for complete search history.

(56) References Cited

U.S. PATENT DOCUMENTS 10,893,221 B2 * 1/2021 Mitani .................. G06T 3/4038
12,147,023 B1 * 11/2024 Laskin ................. H04N 23/958
2015/0256733 A1 * 9/2015 Kanamori ............. G02F 1/0136 348/234
2019/0041518 A1 * 2/2019 Spickermann .......... G01S 17/08
2020/0036946 A1 * 1/2020 Nakamura ............. G02B 5/201
(Continued)

FOREIGN PATENT DOCUMENTS

JP H09281441 A 10/1997
JP 2019086536 A 6/2019
JP 2023086059 A 6/2023

OTHER PUBLICATIONS

International Search Report from International Application No. PCT/JP2023/037059 mailed Dec. 19, 2023, 5 pages.
(Continued)

*Primary Examiner* — Daniel T Tekle
(74) *Attorney, Agent, or Firm* — Shih IP Law Group, PLLC

(57) ABSTRACT

An imaging apparatus includes: a light splitting element that includes a first splitting surface that splits an incident light into a first reflected light and a first transmitted light, and a second splitting surface that splits the first transmitted light into a second reflected light and a second transmitted light; a first sensor that images the first reflected light; a second sensor that images the second reflected light; and a third sensor that images the second transmitted light. One of the first sensor, the second sensor, and the third sensor is a polarization sensor, another one is a visible light sensor, and yet another one is an infrared light sensor.

5 Claims, 5 Drawing Sheets

(56) References Cited

U.S. PATENT DOCUMENTS

| | | | | |
|---|---|---|---|---|
| 2025/0359727 | A1* | 11/2025 | Kobayashi | A61B 1/00009 |
| 2026/0126529 | A1* | 5/2026 | Okanoue | G01S 7/484 |

OTHER PUBLICATIONS

International Preliminary Examination Report on Patentability (I) from International Application No. PCT/JP2023/037059 mailed Jun. 24, 2025, 10 pages.

* cited by examiner

IMAGING APPARATUS

CROSS REFERENCE TO RELATED APPLICATION

This application is a continuation of application No. PCT/JP2023/037059, filed on Oct. 12, 2023, and claims the benefit of priority from the prior Japanese Patent Application No. 2022-204350, filed on Dec. 21, 2022, the entire content of which is incorporated herein by reference.

BACKGROUND

1. Field of the Disclosure

The present disclosure relates to an imaging apparatus.

2. Description of the Related Art

A configuration using a multi-plate prism is known as a multi-plate imaging apparatus configured to capture a common incident light with a plurality of sensors. For example, a configuration in which a polarizer is provided in each of the plurality of sensors to detect the polarization component of the incident light, and a configuration in which red, green, blue, and infrared lights are imaged using a spectroscopic prism are known (see, for example, Patent Literatures 1 and 2).

Patent Literature 1: JPH9-281441

Patent Literature 2: JP2019-86536

In a particular application, it is preferable to be able to capture all of a visible light image, an infrared light image, and a polarization image.

SUMMARY

An imaging apparatus according to an embodiment of the present disclosure includes: a light splitting element that includes a first splitting surface that splits an incident light into a first reflected light and a first transmitted light, and a second splitting surface that splits the first transmitted light into a second reflected light and a second transmitted light; a first sensor that images the first reflected light; a second sensor that images the second reflected light; and a third sensor that images the second transmitted light. One of the first sensor, the second sensor, and the third sensor is a polarization sensor including a plurality of first pixels provided with a first polarizer adapted to transmit a linearly polarized light in the first direction, a plurality of second pixels provided with a second polarizer adapted to transmit a linearly polarized light in the second direction intersecting the first direction, a plurality of third pixels provided with a third polarizer adapted to transmit a linearly polarized light in the third direction intersecting the first direction and the second direction, and a plurality of fourth pixels provided with a fourth polarizer adapted to transmit a linearly polarized light in the fourth direction intersecting the first direction, the second direction, and the third direction, wherein another one of the first sensor, the second sensor, and the third sensor is a visible light sensor including a plurality of pixels provided with a filter adapted to transmit a visible light, and wherein yet another of the first sensor, the second sensor, and the third sensor is an infrared light sensor including a plurality of pixels provided with a filter adapted to transmit an infrared light.

Optional combinations of the aforementioned constituting elements, and mutual substitution of constituting elements and implementations of the present disclosure between methods, apparatuses, systems, etc. may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
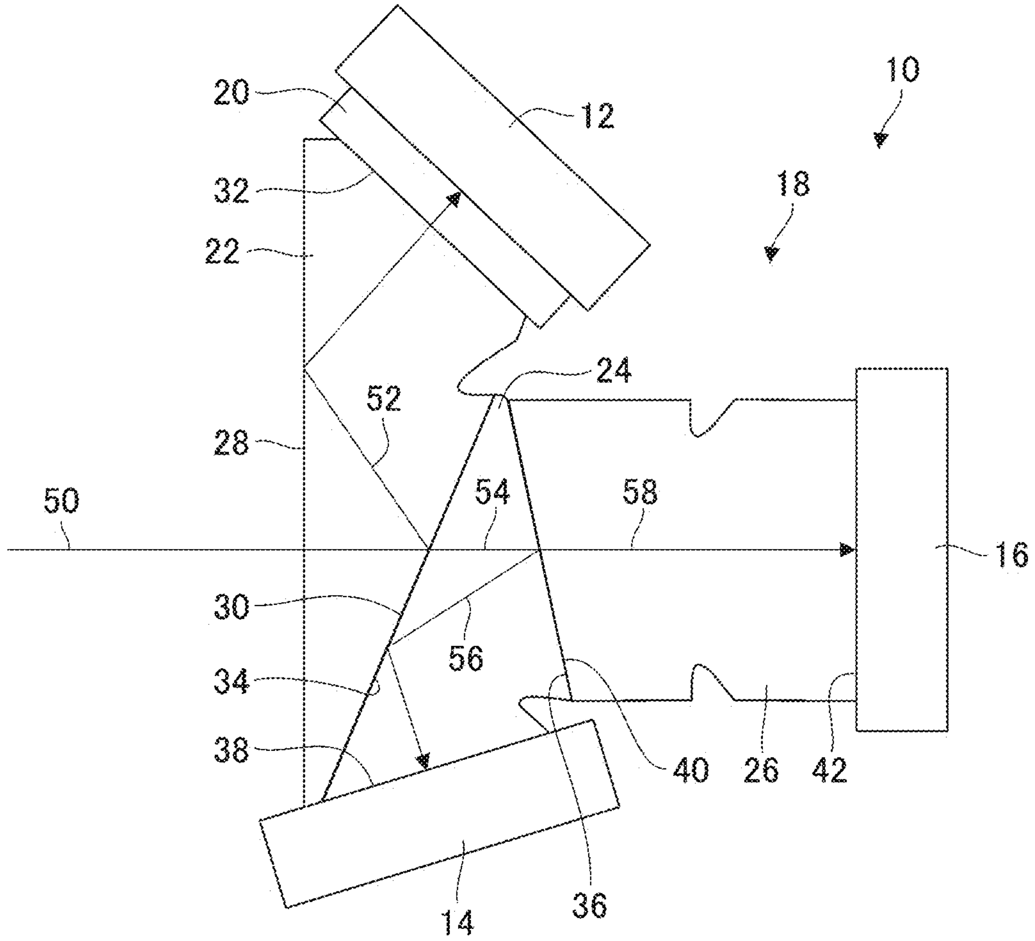
FIG. 1 schematically shows a configuration of an imaging apparatus according to the first embodiment.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the drawings not directly relevant to the invention are omitted from the illustration.

The invention will now be described by reference to the preferred embodiments. This does not intend to limit the scope of the present invention, but to exemplify the invention. According to the present disclosure, it is possible to provide an imaging apparatus capable of capturing a visible light image, an infrared light image, and a polarization image.

An outline of embodiments will be described. In the embodiments, a common incident light is divided into a plurality of lights using a light splitting element, and each of the plurality of split lights is imaged by a polarization sensor, a visible light sensor, or an infrared light sensor. The imaging apparatus according to the embodiments can be used as, for example, a vehicle-mounted sensor for detecting an object around the vehicle. In the embodiments, it is ensured that the polarization sensor can capture a proper polarization image by suppressing the change in the polarization state on the light path of the incident light toward the polarization sensor.

First Embodiment

FIG. 1 schematically shows a configuration of an imaging apparatus 10 according to the first embodiment. The imaging apparatus 10 includes a first sensor 12, a second sensor 14, a third sensor 16, a light splitting element 18, and a phase difference plate 20. The imaging apparatus 10 is a so-called three-plate camera and is configured to split an incident light 50 using the light splitting element 18 and capture an image with each of the first sensor 12, the second sensor 14, and the third sensor 16.

The light splitting element 18 includes a first prism 22, a second prism 24, and a third prism 26. The light splitting element 18 is a so-called three-plate prism. The first prism 22 includes a first incidence surface 28, a first splitting surface 30, and a first exit surface 32. The second prism 24 includes a second incidence surface 34, a second splitting surface 36, and a second exit surface 38. The third prism 26 includes a third incidence surface 40 and a third exit surface 42. An air gap is provided between the first splitting surface 30 and the second incidence surface 34.

The incident light 50 incident on the first incidence surface 28 is split into a first reflected light 52 and a first transmitted light 54 by the first splitting surface 30. The first reflected light 52 reflected by the first splitting surface 30 is totally reflected internally by the first incidence surface 28 and is then transmitted through the first exit surface 32 to travel toward the first sensor 12. The first transmitted light 54 transmitted through the first splitting surface 30 is split into a second reflected light 56 and a second transmitted light 58 by the second splitting surface 36. The second reflected light 56 reflected by the second splitting surface 36 is totally reflected internally by the second incidence surface 34 and is then transmitted through the second exit surface 38 to travel toward the second sensor 14. The second transmitted light 58 transmitted through the second splitting surface 36 is transmitted through the third incidence surface 40 and the third exit surface 42 to travel toward the third sensor 16.

The first sensor 12, the second sensor 14 and the third sensor 16 are a polarization sensor, a visible light sensors, or an infrared light sensors. Specifically, one of the first sensor 12, the second sensor 14, and the third sensor 16 is a polarization sensor, another one of the first sensor 12, the second sensor 14 and the third sensor 16 is a visible light sensor, and yet another one of the first sensor 12, the second sensor 14 and the third sensor 16 is an infrared light sensor. Each of the polarization sensor, the visible light sensor, and the infrared light sensor includes an imaging element including a plurality of pixels. A two-dimensional image sensor such as a CCD (Charge Coupled Device) and a CMOS (Complementary Metal Oxide Semiconductor) can be used as the imaging element.

Figure 2:
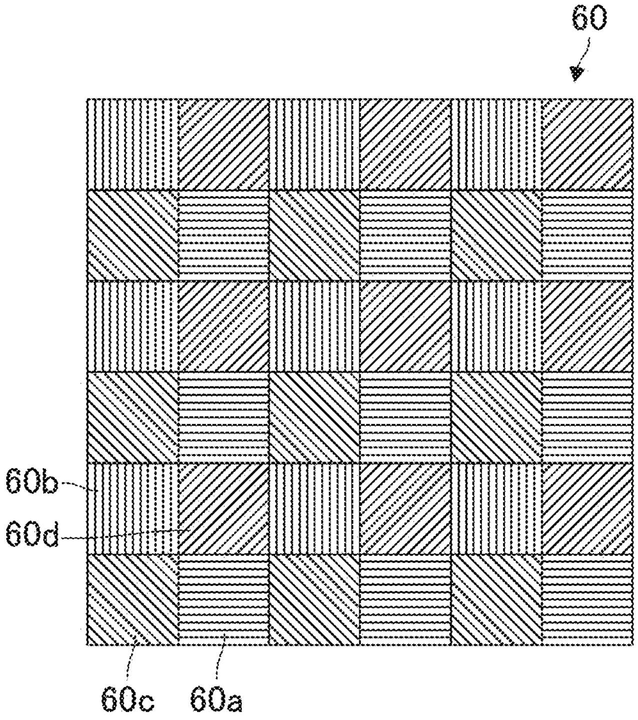
FIG. 2 schematically shows a configuration of polarizers included in a polarization sensor.

FIG. 2 schematically shows a configuration of polarizers 60*a*, 60*b*, 60*c*, and 60*d* included in a polarization sensor 60. The polarization sensor 60 includes a first polarizer 60*a*, a second polarizer 60*b*, a third polarizer 60*c*, and a fourth polarizer 60*d* arranged to correspond to respective pixels of the imaging element. The first polarizer 60*a* selectively transmits a linearly polarized light in the first direction (e.g., 0 degree direction). The second polarizer 60*b* selectively transmits a linearly polarized light in the second direction (e.g., 90 degree direction) intersecting the first direction. The third polarizer 60*c* selectively transmits a linearly polarized light in the third direction (e.g., 45 degree direction) intersecting the first direction and the second direction. The fourth polarizer 60*d* selectively transmits a linearly polarized light in the fourth direction (e.g., 135 degree direction) intersecting the first direction, the second direction, and the third direction. The polarizers 60*a*-60*d* are arranged in a Bayer arrangement to correspond to the plurality of pixels of the imaging element. The polarization sensor 60 includes a plurality of first pixels provided with the first polarizer 60*a*, a plurality of second pixels provided with the second polarizer 60*b*, a plurality of third pixels provided with the third polarizer 60*c*, and a plurality of fourth pixels provided with the fourth polarizer 60*d*.

Figure 3:
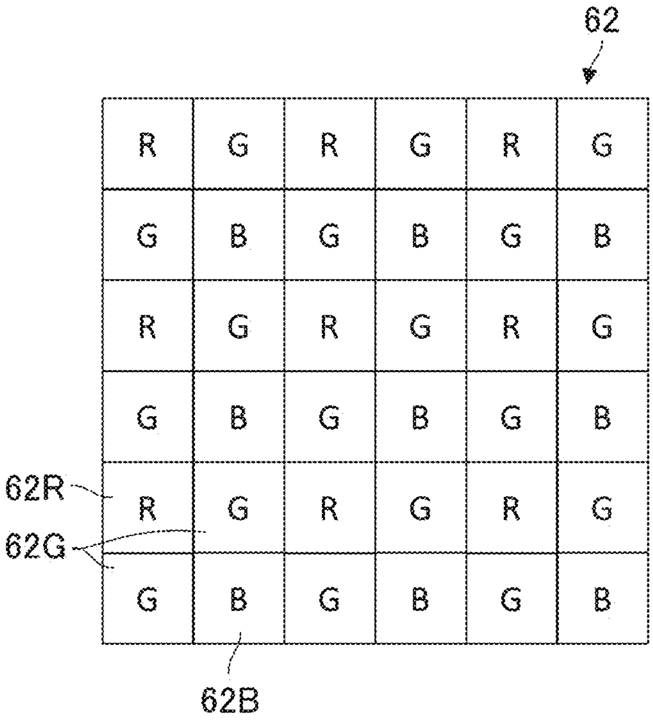
FIG. 3 schematically shows a configuration of visible light filters included in a visible light sensor.

FIG. 3 schematically shows a configuration of visible light filters 62R, 62G, and 62B included in a visible light sensor 62. The visible light sensor 62 includes a red filter 62R, a green filter 62G, and a blue filter 62B arranged to correspond to the respective pixels of the imaging element. The visible light filters 62R, 62G, and 62B are arranged in a Bayer arrangement so as to correspond to the plurality of pixels of the imaging element. The visible light sensor 62 includes a plurality of pixels provided with the red filter 62R, a plurality of pixels provided with the green filter 62G, and a plurality of pixels provided with the blue filter 62B.

The infrared light sensor (not shown) includes a plurality of pixels provided with an infrared light filter that selectively transmits an infrared light. The infrared light sensor is, for example, a range image sensor that measures the distance to an object using an infrared light radiated from an infrared light source, provided separately from the imaging apparatus 10, to the object. For example, the infrared light sensor is a LIDAR (Light Detection And Ranging) sensor. The infrared light sensor measures the distance to the object by, for example, a ToF (Time of Flight) scheme.

In the first embodiment of FIG. 1, the first sensor 12 can be the polarization sensor 60. The polarization state of the first reflected light 52 traveling toward the first sensor 12 can be changed as the first reflected light 52 is reflected by the first splitting surface 30 and the first incidence surface 28. In other words, the polarization state of the first reflected light 52 can change from the polarization state of the incident light 50. When the first reflected light 52 is totally reflected internally by the first incidence surface 28, which is the interface between the prism and the air, in particular, the polarization state of the first reflected light 52 can change significantly. When the polarization state of the first reflected light 52 changes from the polarization state of the incident light 50, the polarization sensor 60 cannot correctly measure the polarization state of the incident light 50.

In this embodiment, a phase difference plate 20 is provided between the first sensor 12 and the light splitting element 18 in order to compensate for the change in the polarization state of the first reflected light 52 caused by the light splitting element 18. The phase difference of the phase difference plate 20 is set to reduce or cancel the phase difference between the s-polarization component and the p-polarization component of the first reflected light 52 caused by at least one of the reflection by the first splitting surface 30 or the reflection by the first incidence surface 28. The magnitude of the phase difference provided by the phase difference plate 20 is not particularly limited and is, for example, about 120 degrees.

In the case the first sensor 12 is configured as the polarization sensor 60, the first splitting surface 30 preferably includes a wavelength-independent non-polarization beam splitter. "Non-polarization" in this case means that the effect on a polarized light is negligible. The non-polarization beam splitter is configured such that the change in the polarization state before and after reflection and before and after transmission in the beam splitter is negligible. For example, a metal thin film can be used as the wavelength-independent non-polarization beam splitter. A dielectric multilayer film designed to suppress the change in the polarization state can also be used as the wavelength-independent non-polarization beam splitter. The change in the polarization state of the first reflected light 52 reflected by the first splitting surface 30 can be suppressed by providing a non-polarization light beam splitter on the first splitting surface 30.

When the first sensor 12 is configured as the polarization sensor 60, one of the second sensor 14 and the third sensor 16 is the visible light sensor 62, and the other of the second sensor 14 and the third sensor 16 is an infrared light sensor. In this case, the second splitting surface 36 preferably includes a dichroic mirror that separates a visible light from an infrared light. For example, a dielectric multilayer film can be used as the dichroic mirror. In the case the second sensor 14 is a visible light sensor 62, the dichroic mirror provided on the second splitting surface 36 is designed to selectively reflect a visible light and selectively transmit an infrared light. In the case the second sensor 14 is an infrared light sensor, the dichroic mirror provided on the second splitting surface 36 is designed to selectively transmit a visible light and selectively reflect an infrared light. The second splitting surface 36 may include a wavelength-independent beam splitter such as a half mirror instead of a dichroic mirror.

According to this embodiment, the incident light 50 can be imaged using each of the polarization sensor 60, the visible light sensor 62, and the infrared light sensor to obtain a polarization image, a visible light image, and an infrared light image, by using the light splitting element 18. According to this embodiment, it is possible to provide a configuration in which a dichroic mirror is not disposed on the optical path toward the polarization sensor 60 by configuring the first sensor 12 as the polarization sensor 60. Thereby, a polarization image that is not affected by the change in the polarization state in the dichroic mirror can be obtained. Further, the change in the polarization state of the first reflected light 52 that occurs on at least one of the first splitting surface 30 or the first incidence surface 28 can be suppressed by providing the phase difference plate 20 between the light splitting element 18 and the polarization sensor 60 (the first sensor 12). Thereby, a polarization image in which the change in the polarization state with respect to the incident light 50 is suppressed can be obtained.

Second Embodiment

Figure 4:
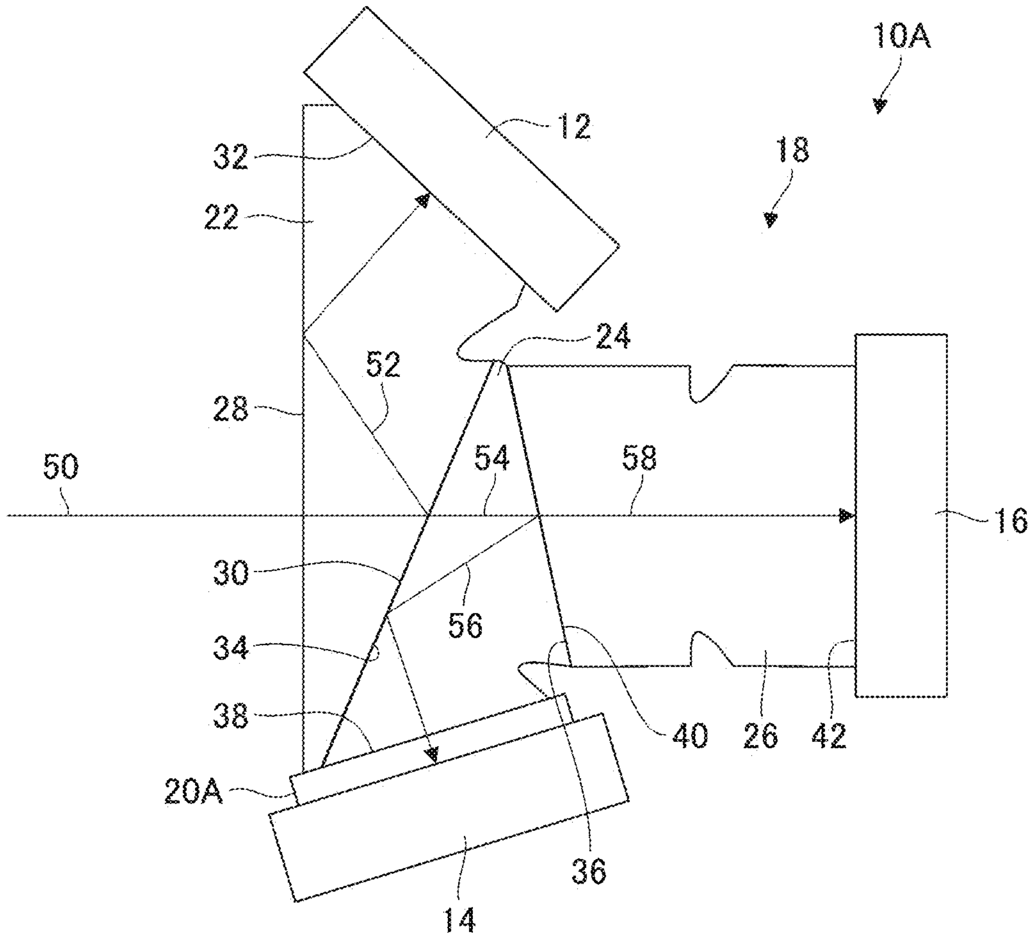
FIG. 4 schematically shows a configuration of an imaging apparatus according to the second embodiment.

FIG. 4 schematically shows a configuration of an imaging apparatus 10A according to the second embodiment. The second embodiment differs from the first embodiment described above in that a phase difference plate 20A is provided between the second sensor 14 and the light splitting element 18. The following description of the second embodiment highlights the difference from the first embodiment. A description of common features is omitted as appropriate.

The imaging apparatus 10A includes a first sensor 12, a second sensor 14, a third sensor 16, a light splitting element 18, and a phase difference plate 20A. In the second embodiment, the second sensor 14 is the polarization sensor 60. In the second embodiment, one of the first sensor 12 and the third sensor 16 is a visible light sensor 62, and the other of the first sensor 12 and the third sensor 16 is an infrared light sensor.

In the case the first sensor 12 is a visible light sensor 62 and the third sensor 16 is an infrared light sensor, the first splitting surface 30 preferably includes a wavelength-independent non-polarization beam splitter. The change in the polarization state of the first transmitted light 54 transmitted through the first splitting surface 30 can be suppressed by providing a non-polarization light beam splitter on the first splitting surface 30. In the case the first sensor 12 is the visible light sensor 62 and the third sensor 16 is an infrared light sensor, the second splitting surface 36 is preferably a non-polarization dichroic mirror. The dichroic mirror provided on the second splitting surface 36 is designed to selectively reflect a visible light and selectively transmit an infrared light. The change in the polarization state of the second reflected light 56 reflected by the second splitting surface 36 can be suppressed by providing a non-polarization dichroic mirror on the second splitting surface 36. The second splitting surface 36 may include a wavelength-independent non-polarization beam splitter such as a half mirror instead of a dichroic mirror.

In the case the first sensor 12 is an infrared light sensor and the third sensor 16 is the visible light sensor 62, the first splitting surface 30 is preferably a non-polarization dichroic mirror. For example, a dielectric multilayer film designed to suppress the change in the polarization state throughout the visible range and the infrared range can be used as a non-polarization dichroic mirror. The dichroic mirror provided on the first splitting surface 30 is designed to selectively transmit a visible light and selectively reflect an infrared light. The change in the polarization state of the first transmitted light 54 transmitted through the first splitting surface 30 can be suppressed by providing a non-polarization dichroic mirror on the first splitting surface 30. The first splitting surface 30 may include a wavelength-independent non-polarization beam splitter instead of a dichroic mirror. In the case the first sensor 12 is an infrared light sensor and the third sensor 16 is the visible light sensor 62, the second splitting surface 36 preferably includes a wavelength-independent non-polarization light beam splitter. The change in the polarization state of the second reflected light 56 reflected by the second splitting surface 36 can be suppressed by providing a non-polarization beam splitter on the second splitting surface 36.

The phase difference of the phase difference plate 20A is set to reduce or cancel the phase difference between the s-polarization component and the p-polarization component of the second reflected light 56 caused by at least one of the transmission through the first splitting surface 30, the reflection by the second splitting surface, or the reflection by the second incidence surface 34. The phase difference plate 20A compensates for the change in the polarization state of the second reflected light 56 caused by the light splitting element 18. When the second reflected light 56 is totally reflected internally by the second incidence surface 34, which is the interface between the prism and the air, in particular, the polarization state of the second reflected light 56 can change significantly. The magnitude of the phase difference provided by the phase difference plate 20A is not particularly limited and is, for example, about 120 degrees.

According to this embodiment, too, the incident light 50 can be imaged using each of the polarization sensor 60, the visible light sensor 62, and the infrared light sensor to obtain a polarization image, a visible light image, and an infrared light image, by using the light splitting element 18. According to this embodiment, the change in the polarization state of the second reflected light 56 that occurs on at least one of the first splitting surface 30, the second splitting surface 36, or the second incidence surface 34 can be suppressed by providing the phase difference plate 20A between the light splitting element 18 and the polarization sensor 60 (the second sensor 14). According to this embodiment, a polarization image in which the change in the polarization state in the dichroic mirror is suppressed can be obtained by providing a non-polarization dichroic mirror on the first splitting surface 30 or the second splitting surface 36. According to the embodiment, a polarization image in which the change in the polarization state in the beam splitter can be suppressed can be obtained by providing a non-polarization light beam splitter on the first splitting surface 30 or the second splitting surface 36.

Third Embodiment

Figure 5:
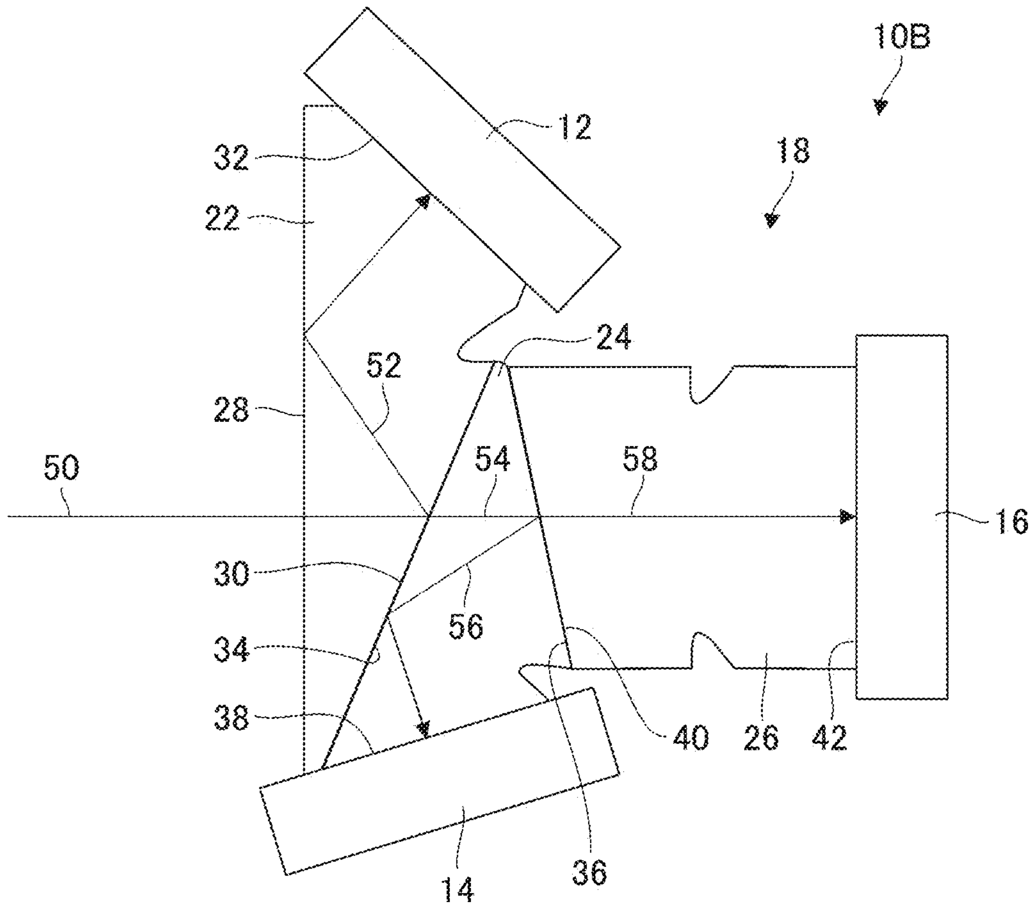
FIG. 5 schematically shows a configuration of an imaging apparatus according to the second embodiment.

FIG. 5 schematically shows a configuration of an imaging apparatus 10B according to the third embodiment. The third embodiment differs from the first embodiment and the second embodiment described above in that the phase difference plate 20, 20A is not provided. The following description of the third embodiment highlights the difference from the first embodiment and the second embodiment. A description of common features is omitted as appropriate.

The imaging apparatus 10B includes a first sensor 12, a second sensor 14, a third sensor 16, and a light splitting element 18. In the third embodiment, the third sensor 16 is the polarization sensor 60. In the third embodiment, one of the first sensor 12 and the second sensor 14 is the visible light sensor 62, and the other of the first sensor 12 and the second sensor 14 is an infrared light sensor.

In the case the first sensor 12 is the visible light sensor 62 and the second sensor 14 is an infrared light sensor, the first splitting surface 30 preferably includes a wavelength-independent non-polarization beam splitter. The change in the polarization state of the first transmitted light 54 transmitted through the first splitting surface 30 can be suppressed by providing a non-polarization light beam splitter on the first splitting surface 30. In the case the first sensor 12 is the visible light sensor 62 and the second sensor 14 is an infrared light sensor, the second splitting surface 36 is preferably a non-polarization dichroic mirror. The dichroic mirror provided on the second splitting surface 36 is designed to selectively transmit a visible light and selectively reflect an infrared light. The change in the polarization state of the second transmitted light 58 transmitted through the second splitting surface 36 can be suppressed by providing a non-polarization dichroic mirror on the second splitting surface 36. The second splitting surface 36 may include a wavelength-independent non-polarization beam splitter such as a half mirror instead of a dichroic mirror.

In the case the first sensor 12 is an infrared light sensor and the second sensor 14 is the visible light sensor 62, the first splitting surface 30 is preferably a wavelength-independent non-polarization beam splitter. The dichroic mirror provided on the first splitting surface 30 is designed to selectively transmit a visible light and selectively reflect an infrared light. The change in the polarization state of the first transmitted light 54 transmitted through the first splitting surface 30 can be suppressed by providing a non-polarization dichroic mirror on the first splitting surface 30. The first splitting surface 30 may include a wavelength-independent non-polarization beam splitter instead of a dichroic mirror. In the case the first sensor 12 is an infrared light sensor and the second sensor 14 is the visible light sensor 62, the second splitting surface 36 preferably includes a wavelength-independent non-polarization beam splitter. The change in the polarization state of the second transmitted light 58 transmitted through the second splitting surface 36 can be suppressed by providing a non-polarization dichroic mirror on the second splitting surface 36.

According to this embodiment, too, the incident light 50 can be imaged using each of the polarization sensor 60, the visible light sensor 62, and the infrared light sensor to obtain a polarization image, a visible light image, and an infrared light image, by using the light splitting element 18. According to this embodiment, it is possible to provide a configuration in which internal total reflection does not occur on a light path toward the polarization sensor 60, by configuring the third sensor 16 as the polarization sensor 60. Thereby, a polarization image that is not affected by the change in the polarization state caused by internal total reflection can be obtained. According to this embodiment, the change in the polarization state of the second transmitted light 58 transmitted through the first splitting surface 30 and the second splitting surface 36 can be suppressed by providing a non-polarization dichroic mirror or a beam splitter on the first splitting surface 30 and the second splitting surface 36. This makes it possible to obtain a proper polarization image without providing a phase difference plate between the light splitting element 18 and the polarization sensor 60 (the third sensor 16).

The invention has been explained with reference to the embodiments described above, but the invention is not limited to the embodiments described above, and appropriate combinations or replacements of the features shown in the examples presented are also encompassed by the present invention.

According to the present disclosure, it is possible to provide an imaging apparatus capable of capturing a visible light image, an infrared light image, and a polarization image.

What is claimed is:

1. An imaging apparatus comprising:

a light splitting element that includes a first splitting surface that splits an incident light into a first reflected light and a first transmitted light, and a second splitting surface that splits the first transmitted light into a second reflected light and a second transmitted light;

a first sensor that images the first reflected light;

a second sensor that images the second reflected light; and a third sensor that images the second transmitted light, wherein one of the first sensor, the second sensor, and the third sensor is a polarization sensor including a plurality of first pixels provided with a first polarizer adapted to transmit a linearly polarized light in the first direction, a plurality of second pixels provided with a second polarizer adapted to transmit a linearly polarized light in the second direction intersecting the first direction, a plurality of third pixels provided with a third polarizer adapted to transmit a linearly polarized light in the third direction intersecting the first direction and the second direction, and a plurality of fourth pixels provided with a fourth polarizer adapted to transmit a linearly polarized light in the fourth direction intersecting the first direction, the second direction, and the third direction, wherein another one of the first sensor, the second sensor, and the third sensor is a visible light sensor including a plurality of pixels provided with a filter adapted to transmit a visible light, and wherein yet another of the first sensor, the second sensor, and the third sensor is an infrared light sensor including a plurality of pixels provided with a filter adapted to transmit an infrared light.

2. The imaging apparatus according to claim 1, wherein one of the first splitting surface and the second splitting surface includes a non-polarization dichroic mirror that separates a visible light from an infrared light, and wherein the other of the first splitting surface and the second splitting surface includes a non-polarization beam splitter.

3. The imaging apparatus according to claim 1, further comprising:

a phase difference plate provided between the light splitting element and the polarization sensor.

4. The imaging apparatus according to claim 1, wherein the light splitting element comprises a first prism including the first splitting surface and a second prism including the second splitting surface, wherein the first prism further includes a first incidence surface on which the incident light is incident and a first exit surface from which the first reflected light totally reflected internally by the first incidence surface exits, wherein the second prism further includes a second incidence surface on which the first transmitted light from the first splitting surface is incident and a second exit surface from which the second reflected light totally reflected internally by the second incidence surface exits, and wherein the polarization sensor is the first sensor, the imaging apparatus further comprising:

a phase difference plate provided between the first exit surface and the polarization sensor.

5. The imaging apparatus according to claim 1, wherein the light splitting element comprises a first prism including the first splitting surface and a second prism including the second splitting surface, wherein the first prism further includes a first incidence surface on which the incident light is incident and a first exit surface from which the first reflected light totally reflected internally by the first incidence surface exits, wherein the second prism further includes a second incidence surface on which the first transmitted light from the first splitting surface is incident and a second exit surface from which the second reflected light totally reflected internally by the second incidence surface exits, and wherein the polarization sensor is the third sensor.

* * * * *